(12) United States Patent
Dibner

(10) Patent No.: US 8,992,146 B2
(45) Date of Patent: Mar. 31, 2015

(54) CARGO SECURING DEVICE

(71) Applicant: Kenneth Dibner, Sarasota, FL (US)

(72) Inventor: Kenneth Dibner, Sarasota, FL (US)

( * ) Notice: Subject to any disclaimer, the term of this patent is extended or adjusted under 35 U.S.C. 154(b) by 0 days.

(21) Appl. No.: 13/922,989

(22) Filed: Jun. 20, 2013

(65) Prior Publication Data
US 2013/0343828 A1 Dec. 26, 2013

Related U.S. Application Data

(60) Provisional application No. 61/663,319, filed on Jun. 22, 2012.

(51) Int. Cl.
B60P 7/08 (2006.01)
B60P 7/14 (2006.01)
(52) U.S. Cl.
CPC .................................. B60P 7/0876 (2013.01)
USPC .............................. 410/96; 410/117; 410/118
(58) Field of Classification Search
USPC ............ 410/96, 120, 32, 34, 99, 121, 35, 41, 410/94, 97, 106, 115, 129, 140, 155; 296/26.08; 248/499
See application file for complete search history.

(56) References Cited

U.S. PATENT DOCUMENTS

| 518,207 | A | | 4/1894 | Cassaday |
|---|---|---|---|---|
| 1,705,381 | A | | 3/1929 | Snyder |
| 3,423,121 | A | * | 1/1969 | Lipkin ........................ 296/24.4 |
| 4,852,194 | A | * | 8/1989 | Langan ............................. 5/427 |
| 4,965,771 | A | * | 10/1990 | Morikawa et al. ............ 358/1.13 |
| 5,452,973 | A | * | 9/1995 | Arvin ............................. 410/118 |
| 6,176,657 | B1 | | 1/2001 | Romph |
| 6,345,944 | B1 | * | 2/2002 | Florence ....................... 410/118 |
| 6,851,903 | B1 | * | 2/2005 | Foggy ........................... 410/118 |
| 6,983,970 | B2 | * | 1/2006 | Bateman .................... 296/24.43 |
| 7,217,074 | B1 | * | 5/2007 | Huber ........................... 410/118 |
| 7,862,268 | B2 | | 1/2011 | Dibner |

* cited by examiner

Primary Examiner — Glenn Dayoan
Assistant Examiner — Sunsurraye Westbrook
(74) Attorney, Agent, or Firm — Gifford, Krass, Sprinkle, Anderson & Citkowski, P.C.

(57) ABSTRACT

A cargo securing device for use in carrying cargo in pickup trucks and the like. The cargo securing device is formed of a flexible panel having straps on opposed sides which extend across the panel to attachment devices such as rings. The flexible panel may include apertures with removable covers to permit the ends of long devices to extend through and to be held from movement sideways.

5 Claims, 6 Drawing Sheets

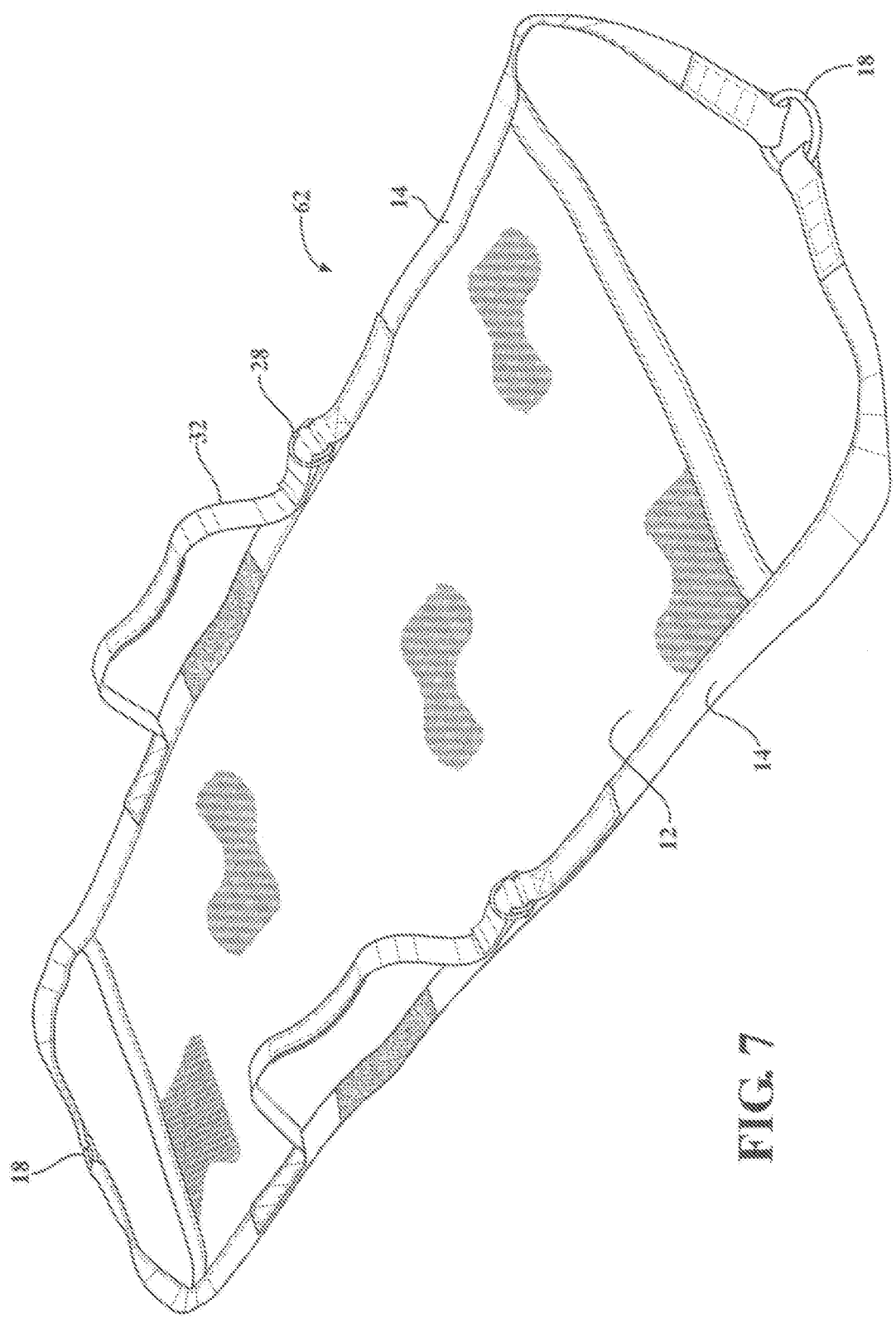

US 8,992,146 B2

CARGO SECURING DEVICE

CROSS-REFERENCE TO RELATED APPLICATIONS

This application claims priority of U.S. Provisional Application 61/663,319 filed Jun. 22, 2012, the contents of which are incorporated herein by reference.

FIELD OF THE INVENTION

A device for holding cargo in a vehicle and, more particularly, for a device for securing cargo in a pickup truck or SUV.

BACKGROUND OF THE INVENTION

Pickup trucks and SUVs are frequently used to haul cargo. However, when using these vehicles to haul long cargo such as ladders and kayaks, or large boxes, it is necessary to secure the items to the vehicle. Typically straps, bungee cords, and other items are used to secure cargo to the vehicles. However, many types of cargo do not have locations that permit easy securing of cargo with straps and the like. Accordingly, it would be desirable to have a device that safely and securely secures the cargo to the vehicle and is easy to use.

SUMMARY OF THE INVENTION

The invention relates to a cargo holder for securing cargo to a vehicle. The cargo holder includes a pair of straps and an elongated flexible panel. The panel extends between the straps, the straps extend at either end of the panel to be joined to an attachment member, such as a ring. The flexible panel is secured around the cargo and the attachment members are secured with ties or connectors to the vehicle. The flexible panel may have a plurality of elongated apertures with covers which are removably attached to the panel permitting access to the apertures. The panel may be provided with an adjustment member which permits adjustment of the overall length of the panel.

BRIEF DESCRIPTION OF THE DRAWINGS

FIG. 7 is a perspective view of an alternative embodiment of the invention.

DETAILED DESCRIPTION OF THE PREFERRED EMBODIMENTS

Figure 1:
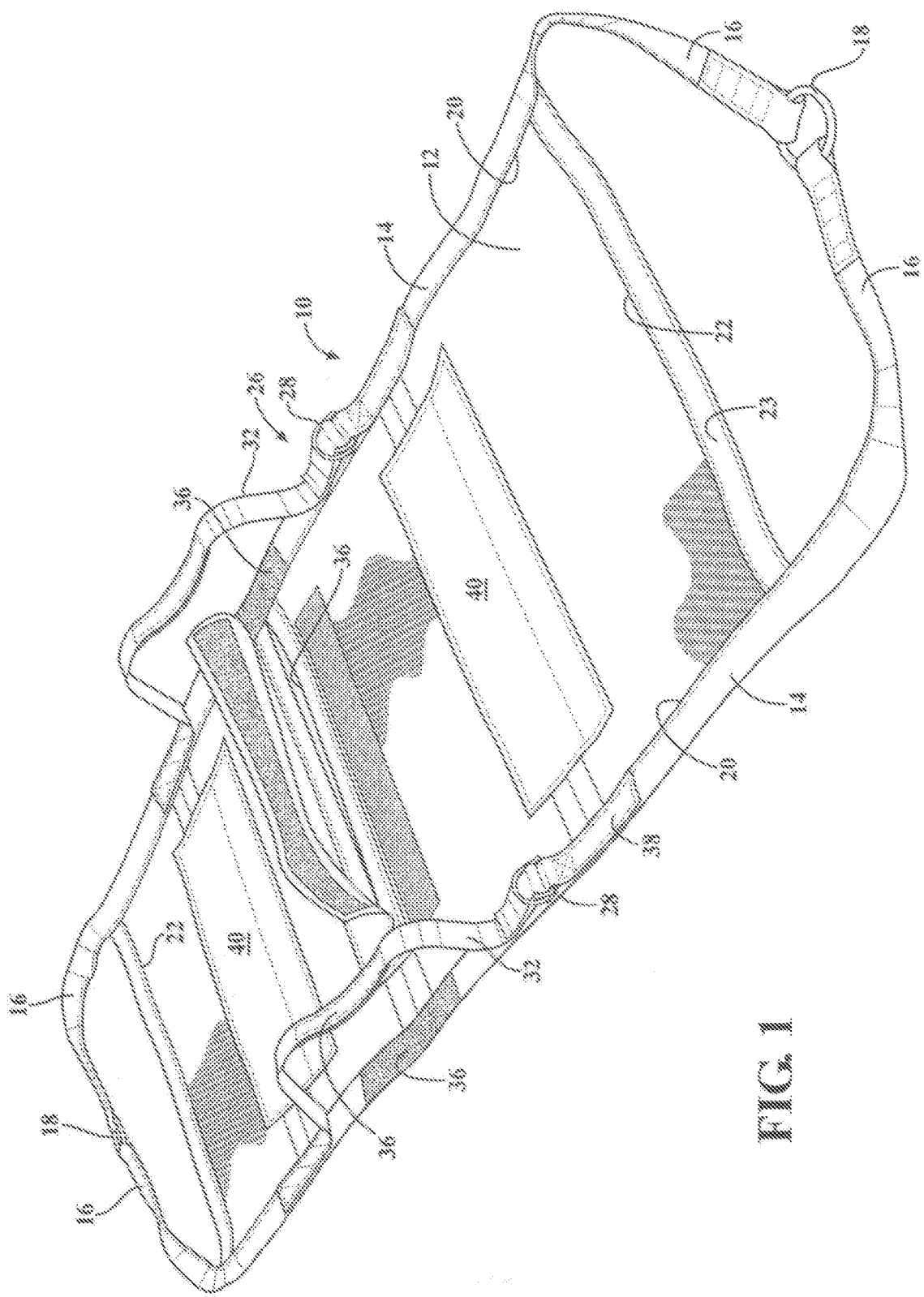
FIG. 1 is a perspective view of the cargo securing device according to a preferred embodiment of the invention.
Figure 2:
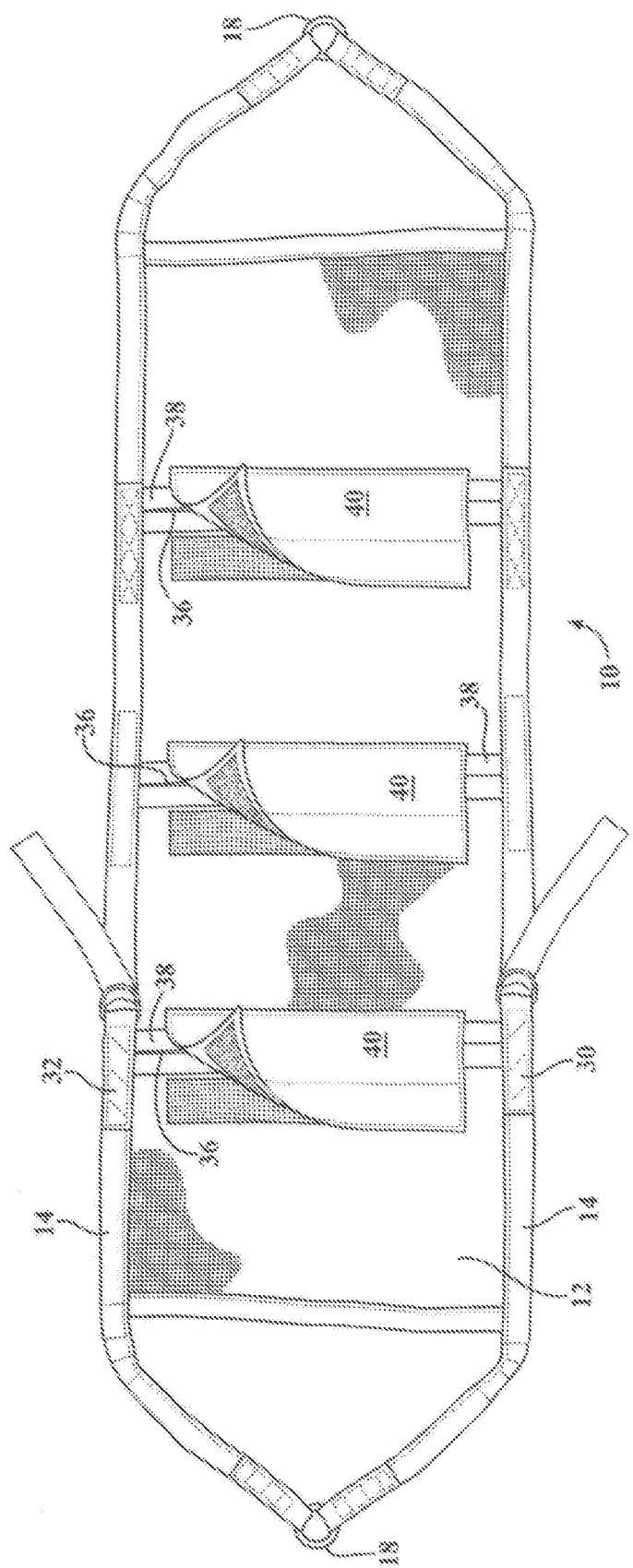
FIG. 2 is a plan view of one side of the cargo holding device in accordance with the preferred embodiment.
Figure 3:
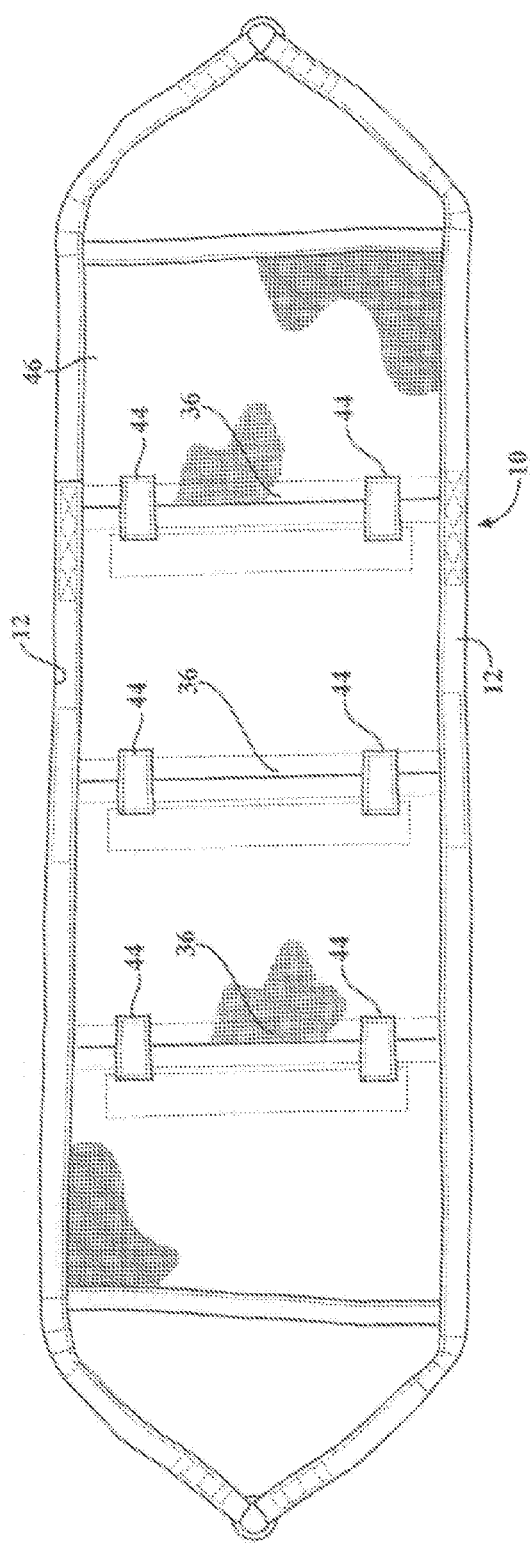
FIG. 3 is a rear side view of the cargo holding device in accordance with the preferred embodiment of the invention.
Figure 4:
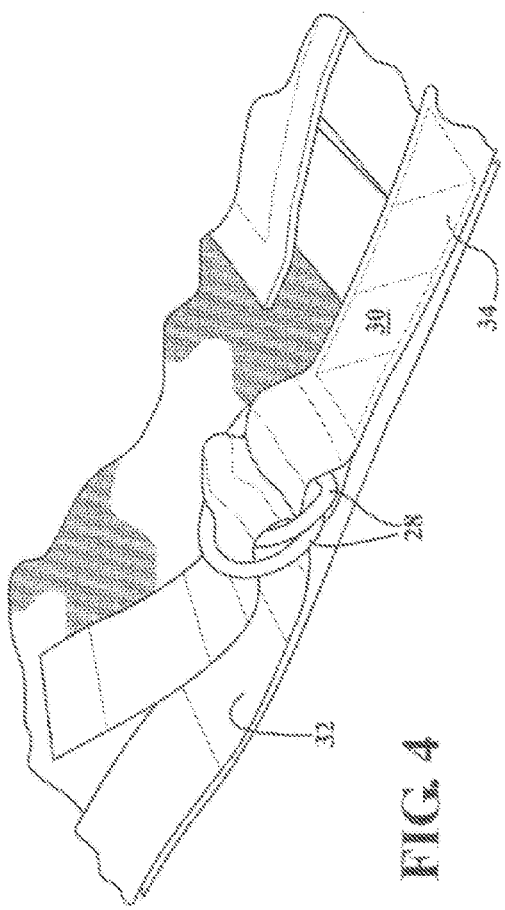
FIG. 4 is a partial view of a lengthening apparatus in accordance with the preferred embodiment of the invention.
Figure 5:
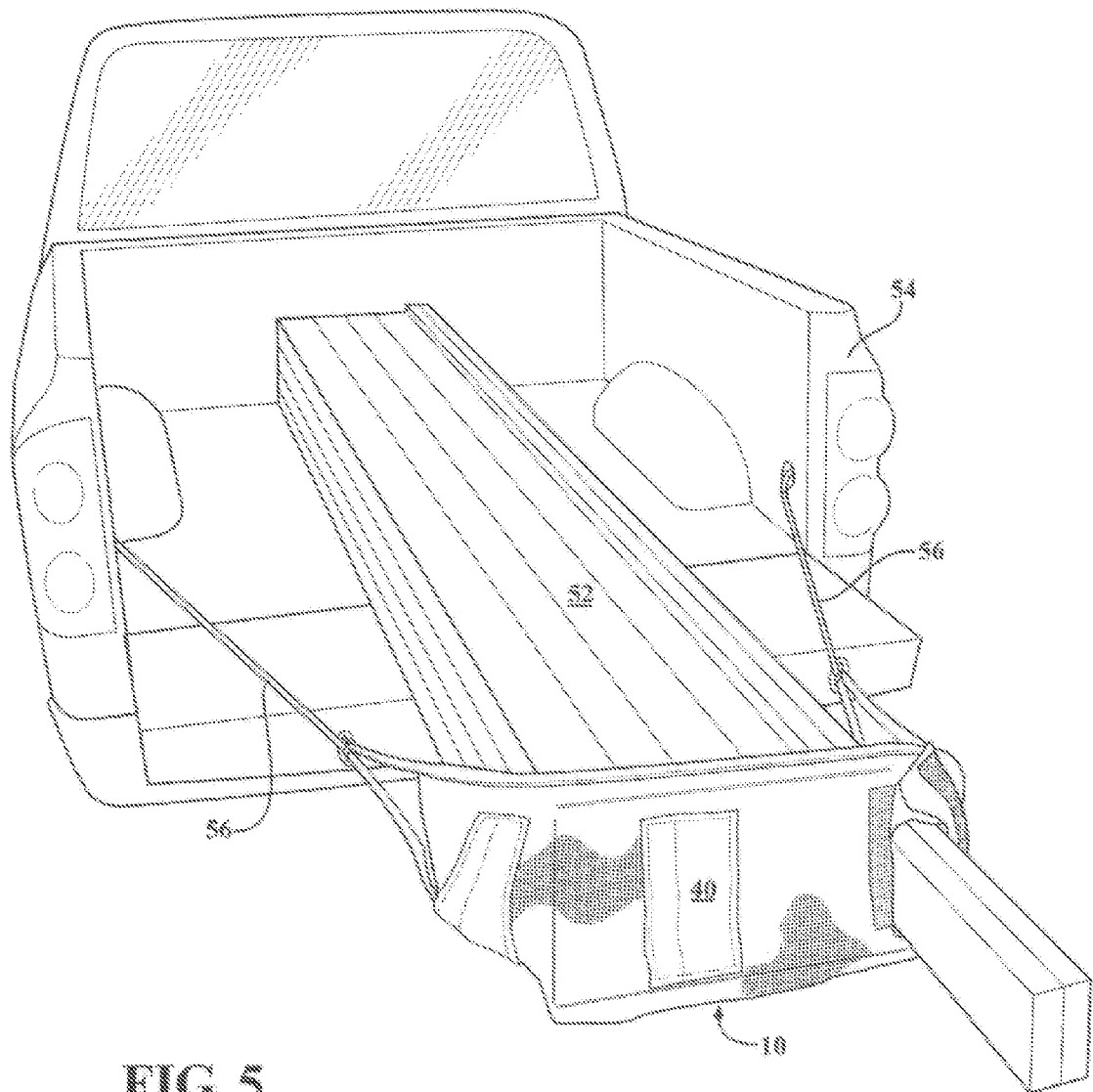
FIG. 5 is a perspective view showing the cargo holder in position for use with securing lumber.
Figure 6:
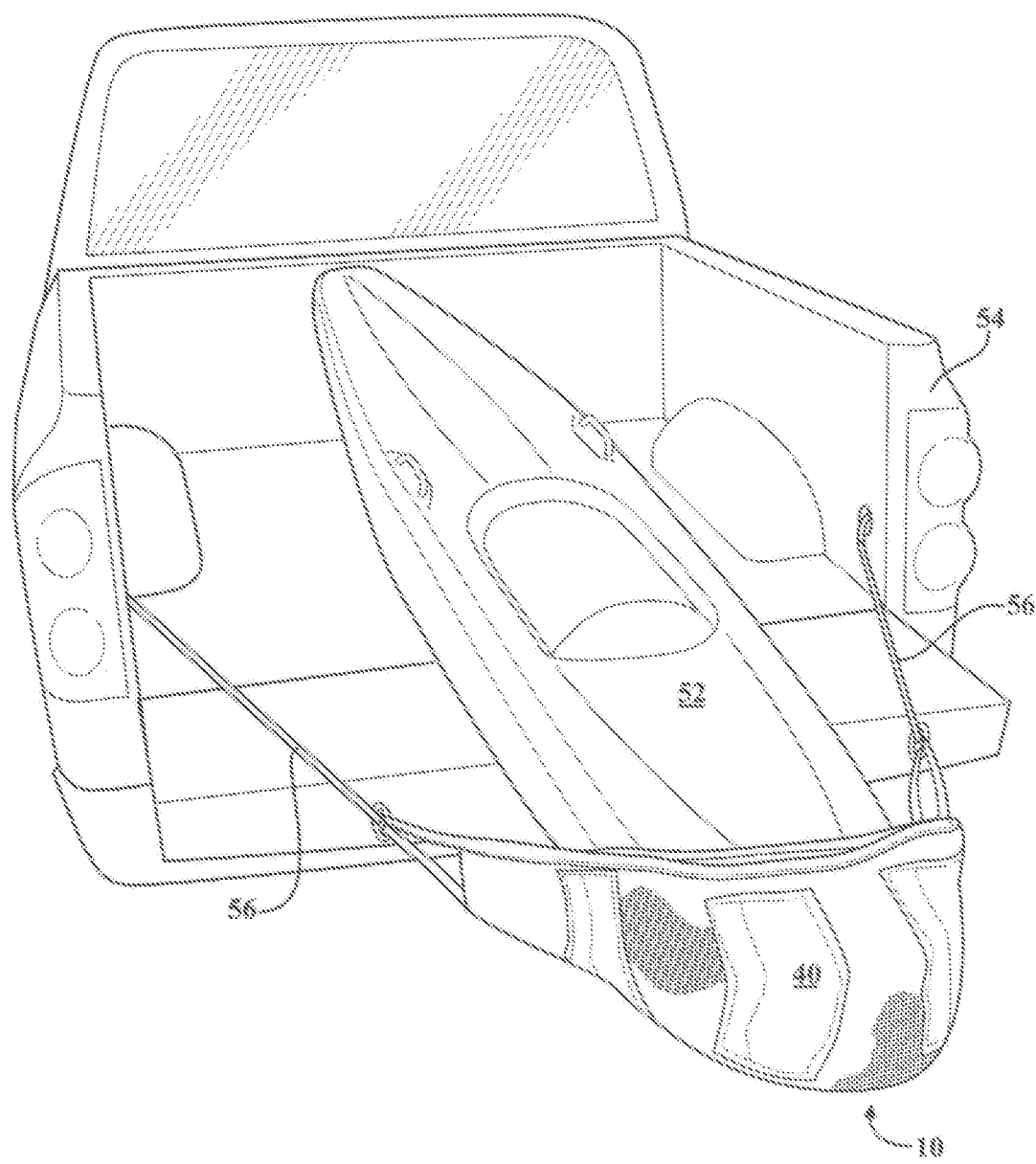
FIG. 6 is a perspective view of the cargo holder in use for a kayak.

A preferred embodiment of a cargo securing device in accordance with the invention is shown in FIGS. 1-6. As best shown in FIG. 1-3, the cargo securing device 10 includes a flexible body panel 12 supported between a pair of flexible straps 14 pairs of ends 16 of the straps 14 are secured to an attachment member 18 at either end. The attachment member 18 is then secured to the vehicle 54 (FIGS. 5 and 6).

As shown in FIG. 1-3, the panel 12 is rectangular having a pair of sides 20 and a pair of ends 22. The panel is formed of a reinforced vinyl material, such as 1000 denier PVC tarp but the panel may be any suitable flexible but strong material such as canvas or synthetic mesh material. The panel is approximately 56" long and 15 inches wide.

The straps 14 are sewn to a peripheral portion of each side 20 of the panel. The straps 14 are formed of a elongated flexible webbing and preferably formed of a synthetic material such as nylon. The ends 16 of the two straps 14 extend beyond the ends 22 of the panel 14. The two ends 16 of the two straps 14 on either side are affixed to an attachment member 18 such as a ring. Thus, both strips extend continuously between the attachment members 18 providing strength to the device. The attachment members 18 may alternatively be hooks or clips which are secured either directly or by straps 56 (FIG. 5) to the vehicle.

As shown in FIGS. 2 and 4 a length adjustment assembly 26 includes a pair of rings 28 secured in an eye of webbing 30 which is affixed to each strap 14. A separate piece of webbing 32 is sewn on the straps 14 in a spaced apart position attachment point 34 from the rings 28. The webbing 32 then can be inserted through the rings 28 and pulled back through to shorten the distance between the rings and an attachment point 34 thus shortening the length dimension of the panel 12. Hook and loop strips 36 may be sewn to the straps 14 and webbing 32 to hold the webbing 32 from moving during use.

As shown in FIG. 1-3, the panel 12 also includes three apertures or slits 36 which extend in a directional parallel to the ends. The slits are approximately 9" long and are equally spaced between the ends 22 of the panel. A pair of reinforcing members 38 formed of webbing extend between the straps 14 and on either side of each slit 36 to provide strength. The reinforcing members 38 are affixed to the panel in a suitable manner such as stitching. Each slit 36 has a cover 40 which is affixed the panel along side of the reinforcing member 38. The cover is formed of a flexible material and is removably secured to the panel in a suitable manner such as strips of hook and loop material 42 or snaps. The cover 40 then can be opened for use to permit a portion of cargo to extend through it if desired or closed so that it abuts the cargo (FIG. 5). As shown in FIG. 3, strips 44 with hook and loop material may be secured on a rear side 46 of the panel to assist in securing the slits 36 from opening.

As shown in FIGS. 5, and 7, the cargo 10 device is placed over the rear edge or edges of the cargo such as a kayak 50 or lumber 52 and then a bungee cord 56 or adjustable straps are used to extend between the attachment device 18 and a convenient portion of the rear of the vehicle 54.

An alternative embodiment of the cargo securing device 62 of the invention is shown in FIG. 7. The alternative embodiment is similar to the preferred embodiment, however it does not include the slits 46, and covers 40 of the device 62 is used in the same way, however it has more limited application than the preferred embodiment.

It will apparent to one skilled in the art that many variations of the invention are within the scope of the invention.

I claim:

1. A cargo holding device for securing cargo to a vehicle comprising;
    a pair of straps, each strap having a first end, a second end, and a center portion, each of the first ends of the straps converging together to attach to a first ring, and each of the second ends converging together to attach to a second ring; and a flexible elongated panel having a pair of peripheral side portions, each of said pair of side portions mounted to the center portion of a respective one of said pair of straps; each of said first ends of the straps extending to the first ring in a direction away from the panel, each of the second ends of the straps extending to the second ring in a direction away from the panel, whereby the panel is adapted to be secured to the vehicle with said panel positioned to hold said cargo in the vehicle.

2. The cargo holder according to claim 1 comprising at least one elongated aperture formed in the panel to extend in a transverse direction with respect to the longitudinal axis of the panel.

3. The cargo holder device of claim 2 comprising a cover which extends over at least one elongated aperture of the panel, the cover being movable between an open position exposing the aperture and a closed position covering the aperture.

4. The cargo holder of claim 1 comprising a flexible member secured to a first portion of the panel and an adjustment member, the flexible member connected to the adjustment member to shorten the distance between the first portion and the second portion of the panel thereby shortening the overall length of the panel.

5. The cargo holding device of claim 1 comprising a pair of flexible web members, each of the pair of webs secured to one of the sides of the panel, each web member extending beyond the end to form one of the flexible straps.

\* \* \* \* \*